US008646160B2

(12) United States Patent
Wu

(10) Patent No.: US 8,646,160 B2
(45) Date of Patent: Feb. 11, 2014

(54) CONNECTORS REMOVAL PLIERS

(76) Inventor: Pi-Liang Wu, Taichung (TW)

( * ) Notice: Subject to any disclaimer, the term of this patent is extended or adjusted under 35 U.S.C. 154(b) by 800 days.

(21) Appl. No.: 12/805,633

(22) Filed: Aug. 11, 2010

(65) Prior Publication Data

US 2012/0036709 A1 Feb. 16, 2012

(51) Int. Cl.
*B23P 19/04* (2006.01)

(52) U.S. Cl.
USPC ............... 29/268; 29/243.56; 81/426; 81/418

(58) Field of Classification Search
USPC ........... 29/745–758, 762–764, 729, 739, 450, 29/243.56, 268; 81/424.5, 420, 426; 72/379.2, 387, 409
See application file for complete search history.

(56) References Cited

U.S. PATENT DOCUMENTS

| | | | | |
|---|---|---|---|---|
| 3,812,859 | A * | 5/1974 | Murphy et al. | 606/117 |
| 5,022,292 | A * | 6/1991 | Hammer et al. | 81/426 |
| 5,626,513 | A * | 5/1997 | Curtis | 452/125 |
| 6,023,833 | A * | 2/2000 | Jacobsmeier | 29/450 |
| 6,216,568 | B1 * | 4/2001 | Breiling | 81/426 |
| 7,143,671 | B1 * | 12/2006 | Lai | 81/368 |
| 7,156,278 | B2 * | 1/2007 | Wu | 228/44.3 |
| 7,194,937 | B1 * | 3/2007 | Melkowits | 81/426 |

* cited by examiner

*Primary Examiner* — Minh Trinh

(57) ABSTRACT

A pair of connector removal pliers includes a first arm and a second arm which is pivotably connected to the first arm by a pin. A positioning member and a pressing member are respectively connected to the first and second arms. The positioning member has a rough surface and the pressing member has a protrusion extending therefrom which extends toward the positioning member. By operating two handles of the first and second arms to position one of two connectors between the positioning member and the pressing member, the technician can easily pull the other connector to separate the two connectors.

7 Claims, 11 Drawing Sheets

CONNECTORS REMOVAL PLIERS

FIELD OF THE INVENTION

The present invention relates to connectors removal pliers, and more particularly, to a pair of pliers having positioning member and a pressing member on two arms so as to easily separate the connectors.

BACKGROUND OF THE INVENTION

Connectors are widely used in electrical mechanisms to electrically connected two groups of wires so as to transmit electric energy and/or electronic signals. The conventional connectors are shown in FIG. 1 and generally include a first connector 1 and a second connector 2, wherein the first and second connectors 1, 2 are made of insulation material. The first connector 1 has a reception portion 102 and the second connector 2 has an insertion 202 which is inserted into the reception portion 102 so as to connect the first and second connectors 1, 2. Each of the first and second connectors 1, 2 includes multiple terminals (not shown) which are made of conductive material and connected with wires 3, 4. When the insertion 202 is inserted into the reception portion 102, the terminals are in contact with each other so as to form the electrical connection between the wires 3, 4. The first and second connectors 1, 2 form a protection to the terminals.

The insertion 202 and the reception portion 102 are shaped and sized such that the friction between the insertion 202 and the reception portion 102 hold the connection so that the first and second connectors 1, 2 are securely connected to each other.

For the need during maintenance, the first and second connectors 1, 2 need to be separated and the technician grasps the first and second connectors 1, 2 by his/her two hands respectively, and then pull the first and second connectors 1, 2 in opposite directions to remove the insertion 202 from the reception portion 102. Because the connection between the insertion 202 and the reception portion 102 is so tight that the technician has to apply a significant force to separate the two parts. However, when the connectors 1, 2 are located in a narrow space such as in an engine room, the connectors 1, 2 may be oily so that it is difficult for the technician to grasp and to separate the first and second connectors 1, 2. Besides, dust and grease located at the conjunction portion between the first and second connectors 1, 2 make the first and second connectors 1, 2 be more difficult to be separated.

The present invention intends to provide connectors removal pliers which help the technician to easily separate the first and second connectors.

SUMMARY OF THE INVENTION

The present invention relates to a pair of connector removal pliers which comprise a first arm having a first handle at a first end thereof and a positioning member connected to a second end of the first arm. The positioning member has a rough surface. The rough surface of the positioning member increases friction between the collectors and the pressing member. A second arm has a second handle at a first end thereof and a pressing member connected to a second end of the second arm. The pressing member has a protrusion extending therefrom which extends toward the positioning member. The protrusion presses the connector and is cooperated with the positioning member to secure the collector. A pin extends through two respective mediate portions of the first and second arms so that the first and second arms are pivotable about the pin.

The protrusion includes a wedge-shaped end which is defined by two inclined surfaces. The wedge-shaped end is inserted into the conjunction portion between the first and second connectors such that the two connectors can be separated easily.

The protrusion may have multiple spikes which are located in a row, and each spike includes a wedge-shaped end which is defined by two inclined surfaces.

An elongate slot is defined through the second arm, and a first hole and a second hole are located at two ends of the elongate slot and in communication with the elongate slot. The pin extends through the first hole and pivotably connects the first and second arms. The pin is movable between the first and second holes via the elongate slot.

An inner diameter of each of the first and second holes is larger than a width of the elongate slot. The pin includes two flat surfaces defined in two opposite sides thereof and the two flat surfaces are parallel to each other. A distance between the two flat surfaces is smaller than the width of the elongate slot so that the pin is movable within the elongate slot with the two flat surfaces moving along two sides of the elongate slot.

The second end of the first arm is mounted with a anti-slip sleeve which includes multiple recesses defined in an outer surface thereof so as to form the rough surface.

The pressing member has a first end connected to the second arm and the protrusion extends from a second end of the pressing member.

Two extensions extend from the first end of the pressing member and are connected to the second arm.

The primary object of the present invention is to provide a pair of connector removal pliers which include a pressing member and a positioning member to clamp one of the two connectors and the two connectors can be easily separated from each other.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
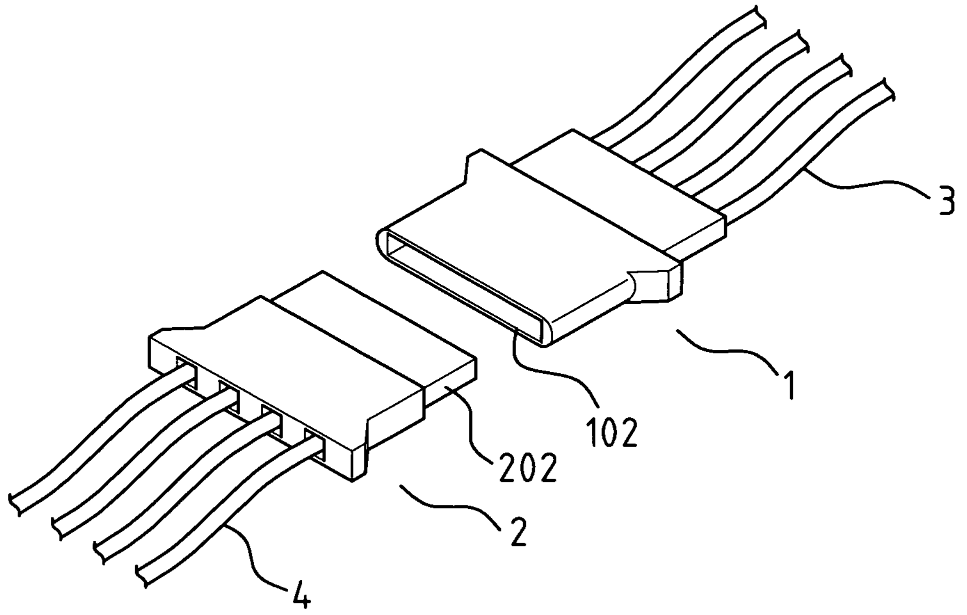
FIG. 1 PRIOR ART
FIG. 1 is a perspective view to show the conventional two connectors connected to each other.

Referring to FIGS. 2 to 5, the pair of connector removal pliers of the present invention comprises a first arm 11, a second arm 12, a pin 13, a positioning member 14, and a pressing member 15. The first arm 11 has a first handle 112 at a first end thereof and a positioning member 14 is connected to a second end of the first arm 11. The second arm 12 has a second handle 122 at a first end thereof and a pressing member 15 is connected to a second end of the second arm 12. A pin 13 extends through two respective mediate portions of the first and second arms 11, 12. The pressing member 15 has a protrusion 154 extending therefrom which extends toward the positioning member 14. The positioning member 14 includes a rough surface. The pressing member 15 and positioning member 14 are moved toward other or away from each other by operation of the first and second handles 112, 122 which are pivoted about the pin 13.

The body 142 of the second end of the first arm 11 is mounted with an anti-slip sleeve 144 which includes multiple recesses defined in an outer surface thereof so as to form the rough surface. The multiple recesses can be made by way of sand blasting and the rough surface has higher friction when in use. When the rough surface become smooth and loses the friction, only the anti-slip sleeve 144 needs to be replaced.

Figure 2:
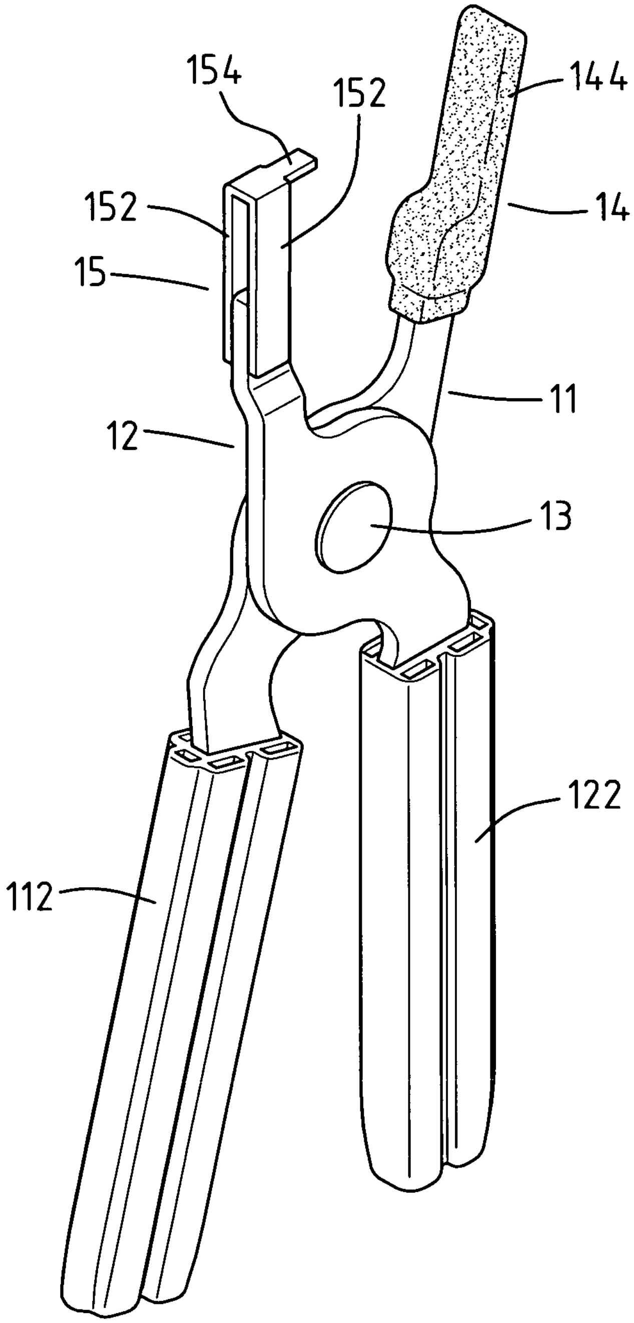
FIG. 2 is a perspective view to show the pliers of the present invention.
Figure 3:
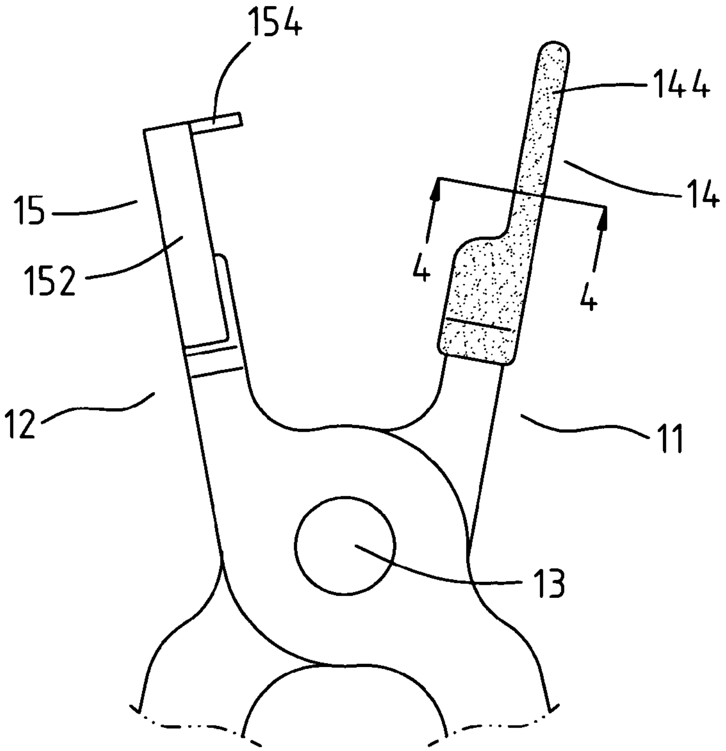
FIG. 3 is an enlarged view to show the pressing member and the positioning member on two arms of the pliers of the present invention.
Figure 4:
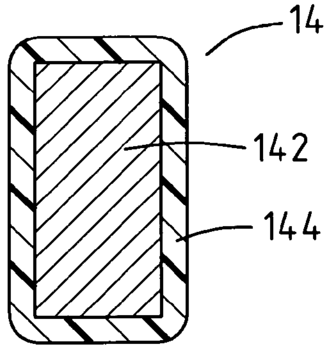
FIG. 4 is a cross sectional view, taken along line 4-4 in FIG. 3.

As shown in FIGS. 2 and 3, the pressing member 15 has a first end connected to the second arm 12 and two extensions 152 extend from the first end of the pressing member 15 so as to be connected to the second arm 12. The protrusion 154 extends from a second end of the pressing member 15.

Figure 5:
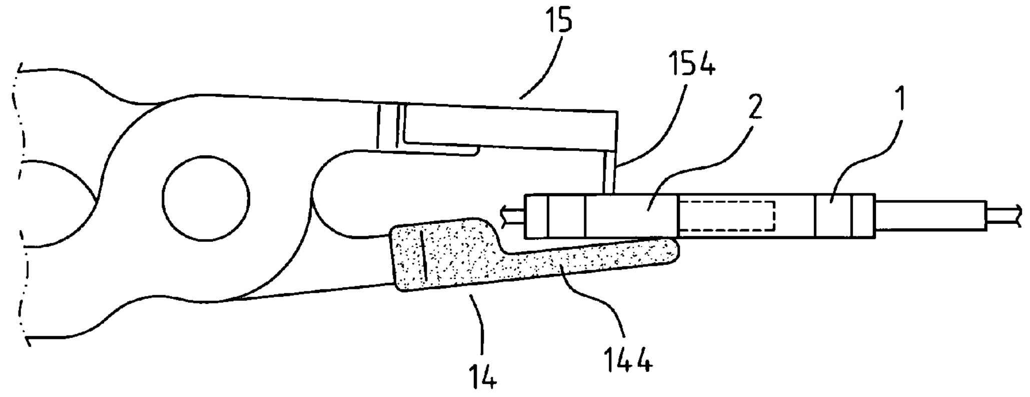
FIG. 5 shows that the pliers of the present invention are used to hold one connector.

As shown in FIGS. 2, 3 and 5, when using the pliers, the user holds the first and second handles 112, 122 and the positioning member 14 and the pressing member 15 are separated and allow two sides of the second connector 2 are clamped between the protrusion 154 of the pressing member 15 and the positioning member 14. The user then holds the first connector 1 and pulls the first connector 1 away from the second connector 2 to separate the first and second connectors 1, 2. Preferably, the protrusion 154 is in contact with the conjunction portion between the first and second connectors 1, 2. By applying a force to the pliers, the second connector 2 is slightly deformed to help the separation of the reception portion 102 and the insertion 202 of the first and second connectors 1, 2.

Figure 6:
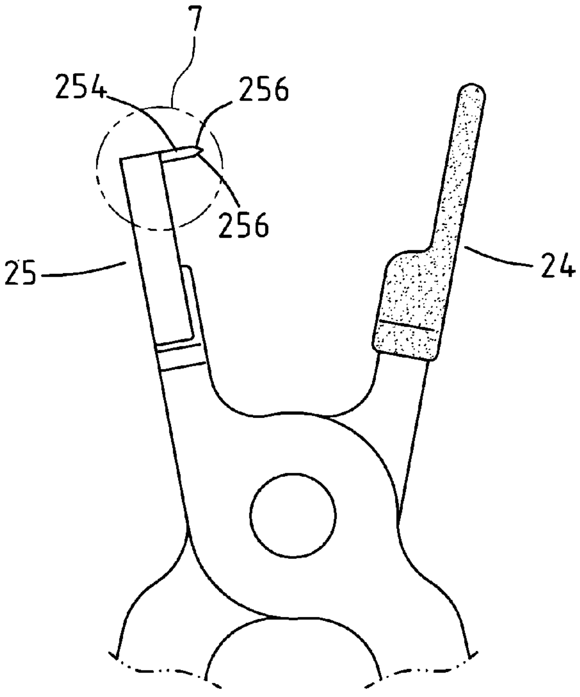
FIG. 6 shows a second embodiment of the pliers of the present invention.
Figure 7:
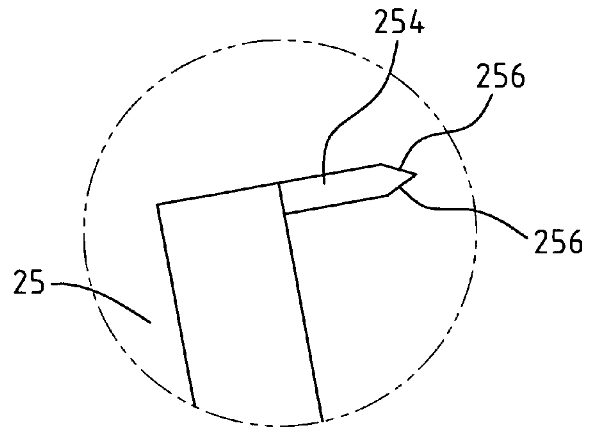
FIG. 7 is an enlarged view to show the circled portion in FIG. 6.
Figure 8:
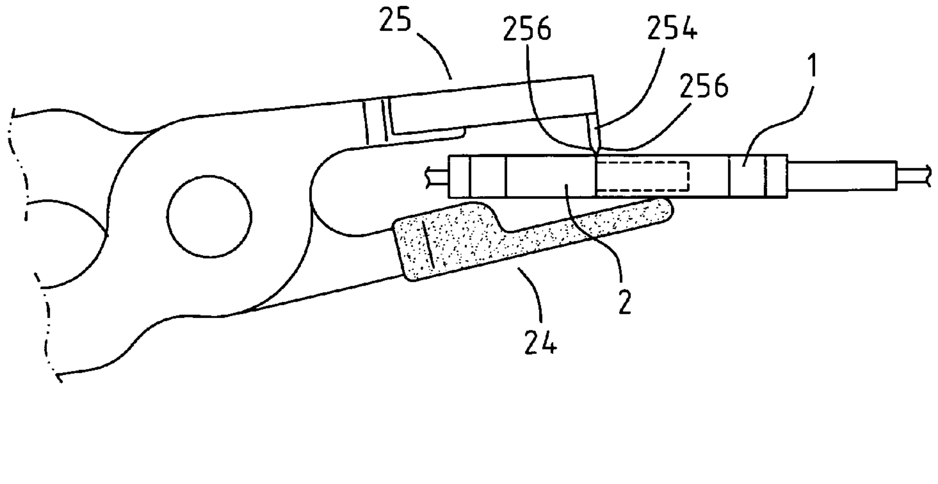
FIG. 8 shows that the second embodiment of the pliers of the present invention is used to hold one connector.

Referring to FIGS. 6 to 8, the second embodiment shows that the protrusion 254 of the pressing member 25 is inserted between the conjunction surfaces between the first and second connectors 1, 2. The protrusion 254 includes a wedge-shaped end which is defined by two inclined surfaces 256. The inclined surfaces 256 of the protrusion 254 respective push and guide the first and second connectors 1, 2 to move in opposite directions to help the separation of the reception portion 102 and the insertion 202 of the first and second connectors 1, 2.

Figure 9:
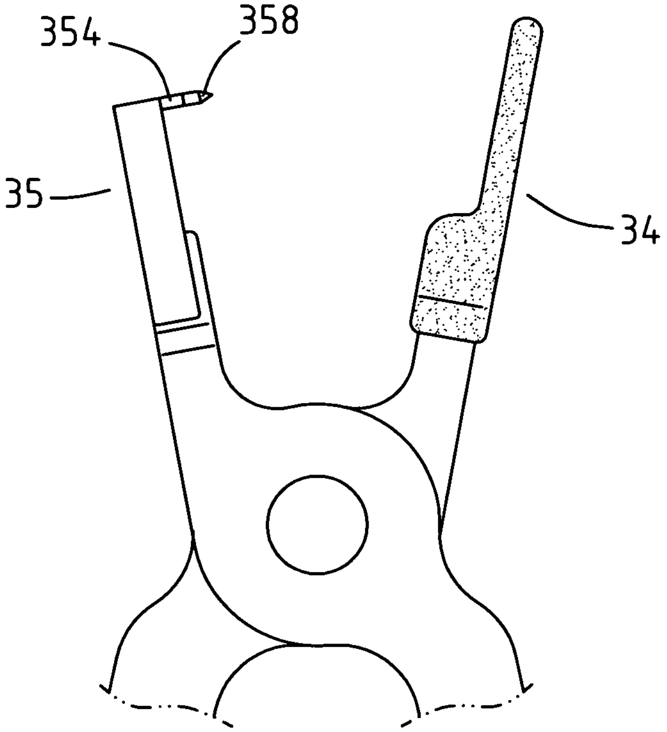
FIG. 9 is an enlarged view to show the pressing member and the positioning member on two arms of the third embodiment of the pliers of the present invention.
Figure 10:
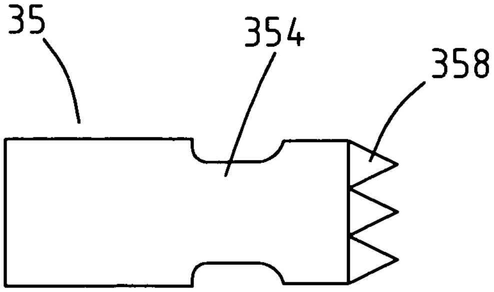
FIG. 10 shows the protrusion on the pressing member of the third embodiment of the pliers of the present invention.

Referring to FIGS. 9 to 10, the third embodiment shows that the protrusion 354 of the pressing member 35 is inserted between the conjunction surfaces between the first and second connectors 1, 2. The protrusion 354 includes multiple spikes 358 which are located in a row. Each spike 358 includes a wedge-shaped end which is defined by two inclined surfaces. The spikes 358 of the protrusion 354 respective push and guide the first and second connectors 1, 2 to move in opposite directions to help the separation of the reception portion 102 and the insertion 202 of the first and second connectors 1, 2.

Figure 11:
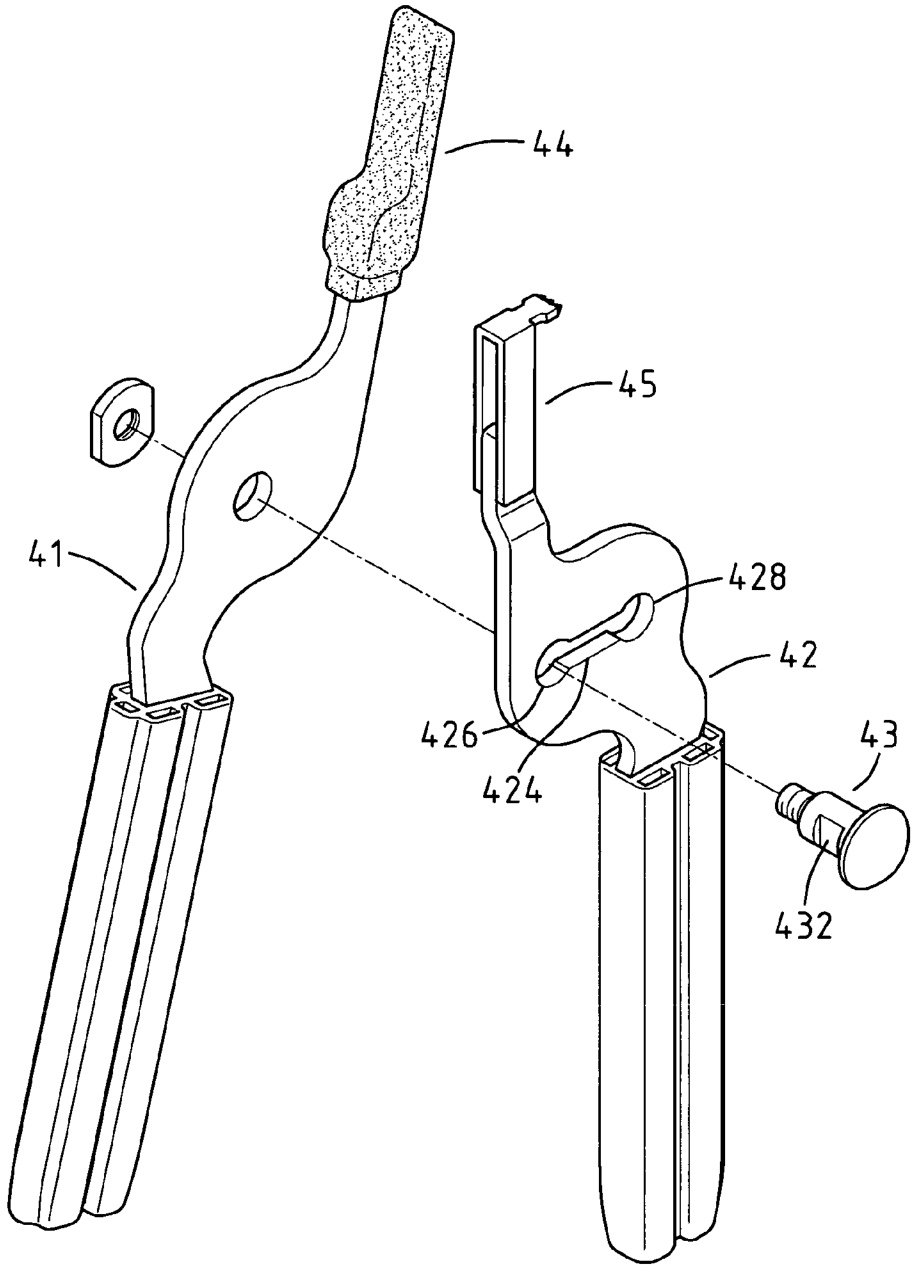
FIG. 11 is an exploded view to show the fourth embodiment of the pliers of the present invention.
Figure 12:
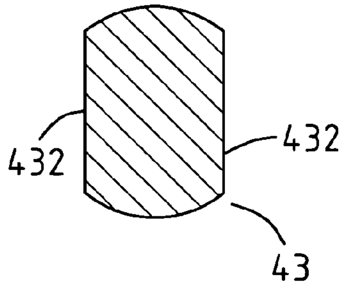
FIG. 12 is a cross sectional view to show the pin in the fourth embodiment of the pliers of the present invention.

FIG. 11 shows the fourth embodiment of the pliers of the present invention and comprises the first arm 41, the second arm 42, the pin 43, the positioning member 44 and a pressing member 45. The first and second arms 41, 42 are pivotably connected to each other by the pin 43, and the positioning member 44 and a pressing member 45 are respectively connected to the first and second arms 41, 42. An elongate slot 424 is defined through the second arm 42, and a first hole 426 and a second hole 428 are located at two ends of the elongate slot 424. The first and second holes 426, 428 communicate with the elongate slot 424. The pin 43 extends through the first hole 426 and pivotably connects the first and second arms 11, 12. The pin 43 is movable between the first and second holes 426, 428 via the elongate slot 424. An inner diameter of each of the first and second holes 426, 428 is larger than a width of the elongate slot 424. As shown in FIG. 12, the pin 43 includes two flat surfaces 432 defined in two opposite sides thereof and the two flat surfaces 432 are parallel to each other. A distance between the two flat surfaces 432 is smaller than the width of the elongate slot 424 so that the pin 43 is movable within the elongate slot 424 with the two flat surfaces 432 moving along two sides of the elongate slot 424.

Figure 13:
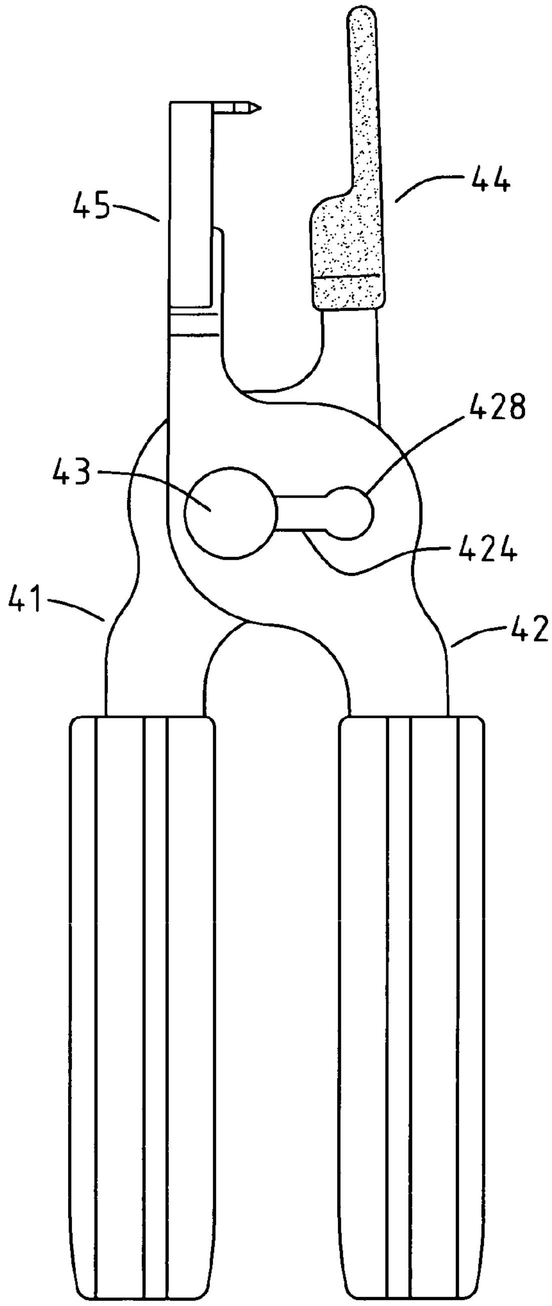
FIG. 13 shows the first status of the fourth embodiment of the pliers of the present invention.
Figure 14:
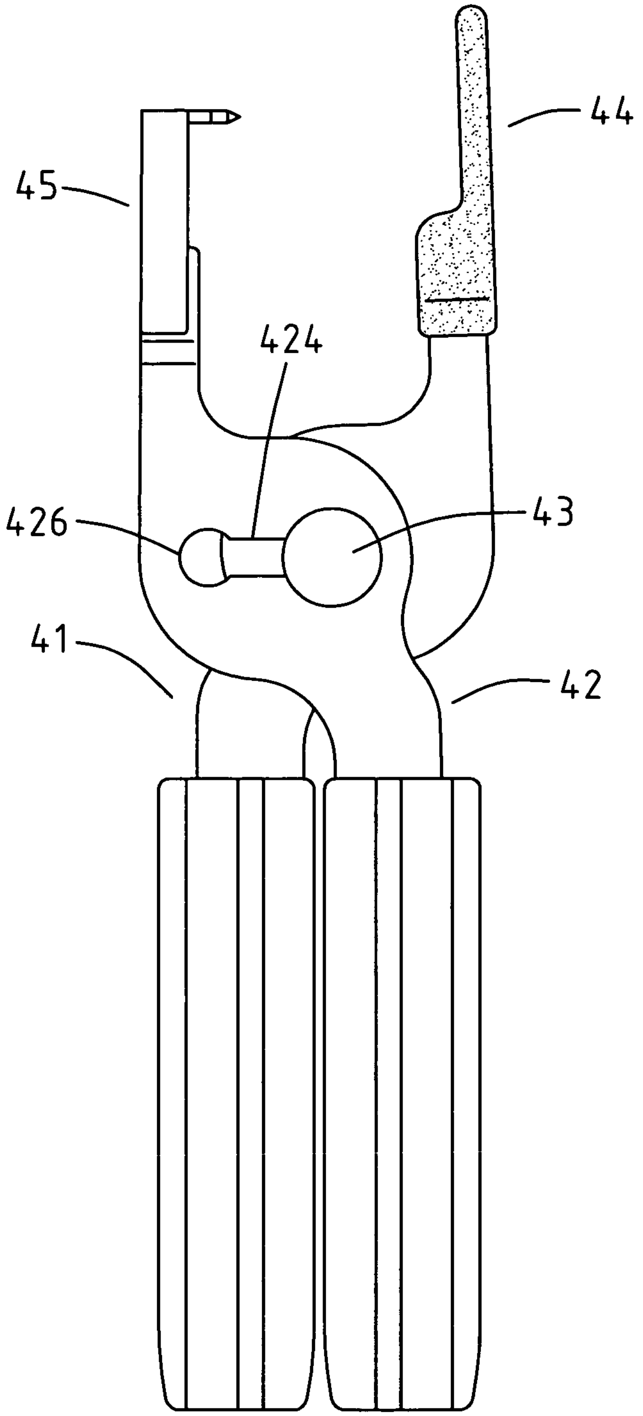
FIG. 14 shows the second status of the fourth embodiment of the pliers of the present invention.
Figure 15:
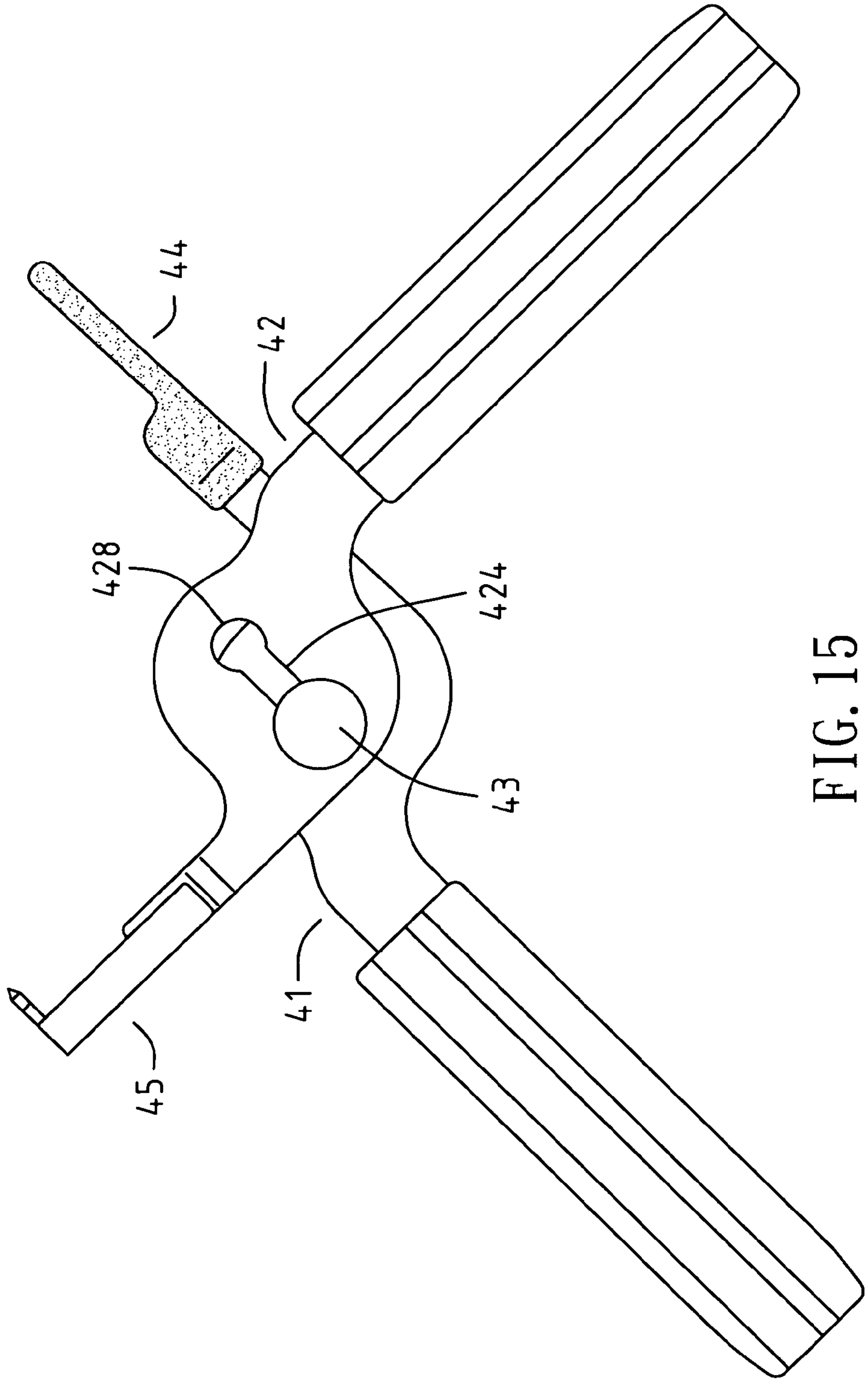
FIG. 15 shows that the pin is to be moved within the elongate slot of the fourth embodiment of the pliers of the present invention.
Figure 16:
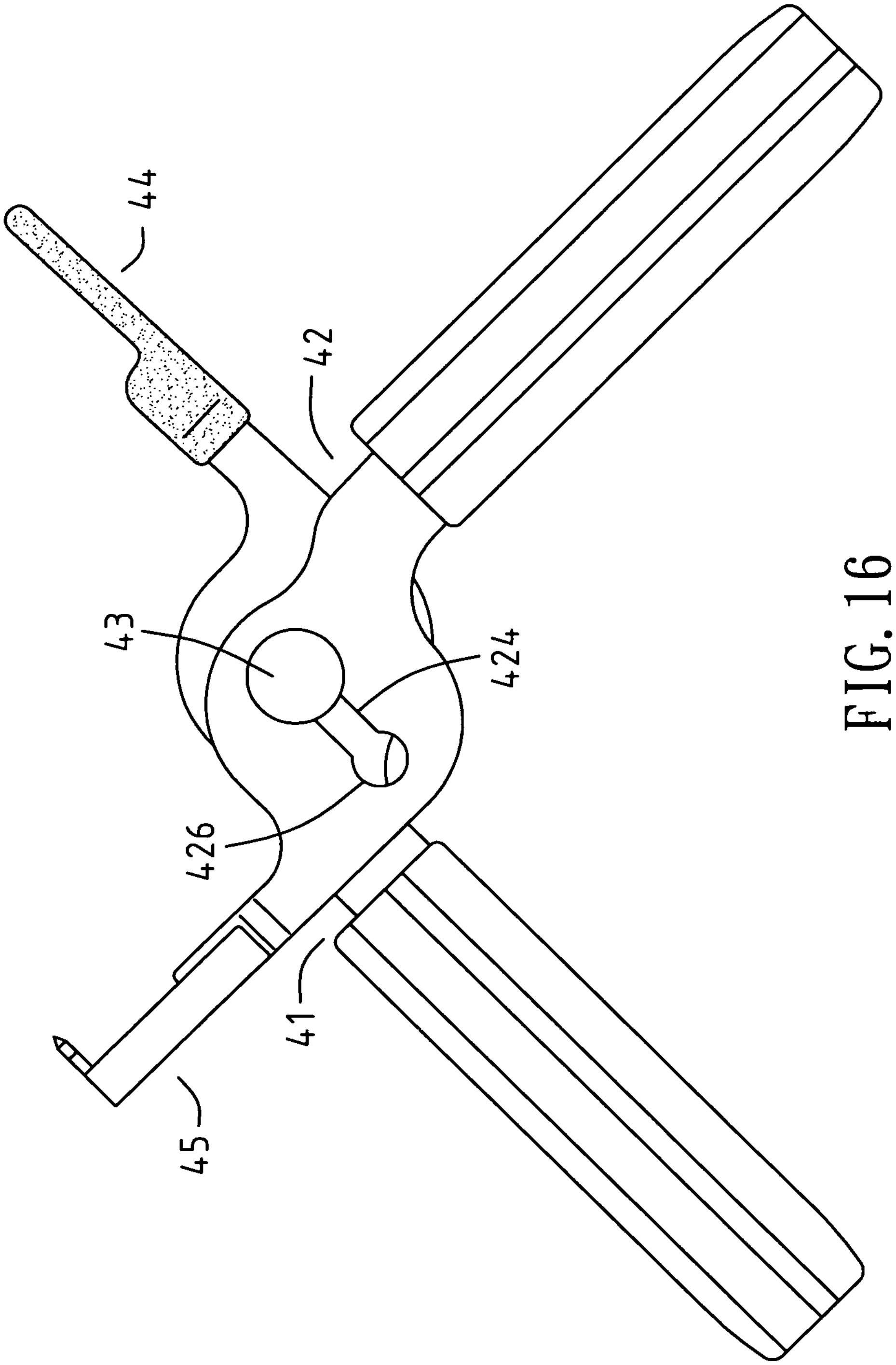
FIG. 16 shows that the pin is moved from one hole to the other via the elongate slot of the fourth embodiment of the pliers of the present invention.

As shown in FIG. 13, because the outer diameter of the pin 43 is larger the width of the elongate slot 424 so that when the pin 43 is engaged with the hole 426, the pin 43 is rotated an angle and cannot enters into the elongate slot 424. In this status, the distance between the positioning member 44 and the pressing member 45 is set so that the user can separate the first and second connectors 1, 2 as described in the previous embodiments. Referring to FIG. 15, when the size of the first and second connectors 1, 2 is different from that disclosed in FIG. 13, the user pivots the first and second arms 41, 42 outward so as to allow the two flat surfaces 432 of the pin 43 face the two sides of the elongate slot 424. The pin 43 is then able to move along the elongate slot 424 and enters into the second hole 428 as shown in FIG. 16. Therefore, the distance between the positioning member 44 and the pressing member 45 is set again. By operating the previous steps of the pliers, the connectors 1, 2 with larger size can be separated. When the distance between the positioning member 44 and the pressing member 45 is to be set as the distance shown in FIG. 13, the user pivots the first and second arms 41, 42 outward again to allow the two flat surfaces 432 of the pin 43 face the two sides of the elongate slot 424. The pin 43 is then able to move along the elongate slot 424 and enters into the first hole 426 as shown in FIG. 13.

Of course, the use of the elongate slot 424, the pin 43 and the first and second holes 426, 428 can be applied to the first and second embodiments of the pliers.

While I have shown and described the embodiment in accordance with the present invention, it should be clear to those skilled in the art that further embodiments may be made without departing from the scope of the present invention.

What is claimed is:

1. A pair of connector removal pliers for use in a connector including a first connector has a reception portion and a second connector has an insertion which is inserted into the reception portion so as to connect the first and second connectors, comprising:

a first arm having a first handle at a first end thereof and a positioning member connected to a second end of the first arm, the positioning member having a rough surface, a body of the second end of the first arm is mounted with an anti-slip sleeve which includes multiple recesses defined in an outer surface thereof so as to form the rough surface;

a second arm having a second handle at a first end thereof and a pressing member connected to a second end of the second arm, the pressing member having a protrusion extending therefrom which extends toward the positioning member, and a pin extending through two respective mediate portions of the first and second arms, the first and second arms being pivotable about the pin.

2. The pliers as claimed in claim 1, wherein the protrusion includes a wedge-shaped end which is defined by two inclined surfaces.

3. The pliers as claimed in claim 1, wherein the protrusion has multiple spikes which are located in a row, each spike includes a wedge-shaped end which is defined by two inclined surfaces.

4. The pliers as claimed in claim 1, wherein an elongate slot is defined through the second arm, a first hole and a second hole are located at two ends of the elongate slot, the first and second holes communicate with the elongate slot, the pin extends through the first hole and pivotably connects the first and second arms, the pin is movable between the first and second holes via the elongate slot.

5. The pliers as claimed in claim 4, wherein an inner diameter of each of the first and second holes is larger than a width of the elongate slot, the pin includes two flat surfaces defined in two opposite sides thereof and the two flat surfaces are parallel to each other, a distance between the two flat surfaces is smaller than the width of the elongate slot so that the pin is movable within the elongate slot with the two flat surfaces moving along two sides of the elongate slot.

6. The pliers as claimed in claim 1, wherein the pressing member has a first end connected to the second arm and the protrusion extends from a second end of the pressing member.

7. The pliers as claimed in claim 6, wherein two extensions extend from the first end of the pressing member and are connected to the second arm.

* * * * *